United States Patent [19]
Luttrell

[11] Patent Number: 5,123,352
[45] Date of Patent: Jun. 23, 1992

[54] BAR CODE PRINTING PLATE AND METHOD

[76] Inventor: Ravon D. Luttrell, 13855 Arapahoe Trail, Lockport, Ill. 60441

[21] Appl. No.: 662,436

[22] Filed: Feb. 28, 1991

[51] Int. Cl.⁵ .............................................. B41F 27/12
[52] U.S. Cl. .................................. 101/375; 101/327; 101/328; 101/372; 101/401; 235/494; 235/463
[58] Field of Search ............... 101/327, 328, 329, 375, 101/376, 379, 401, 415.1, 372, 396, 397, 398, 463, 365, 395, DIG. 46, DIG. 45, DIG. 47; 235/462, 470, 494, 495, 437, 438

[56] References Cited

U.S. PATENT DOCUMENTS

| | | | |
|---|---|---|---|
| 3,393,618 | 7/1968 | Baker | 101/401 |
| 4,183,465 | 1/1980 | Dobras | 101/372 |
| 4,403,548 | 9/1983 | Faller | 101/376 |

Primary Examiner—Edgar S. Burr
Assistant Examiner—Joseph R. Keating
Attorney, Agent, or Firm—Kinzer, Plyer, Dorn, McEachran & Jambor

[57] ABSTRACT

A flexible bar code printing plate formed with an ink density gauge rib for concurrently printing a tint gauge whereby the code and tint gauge are printed concurrently enabling the printed gauge to be inspected for a tint pattern deemed indicative of a well-printed bar code image.

12 Claims, 2 Drawing Sheets

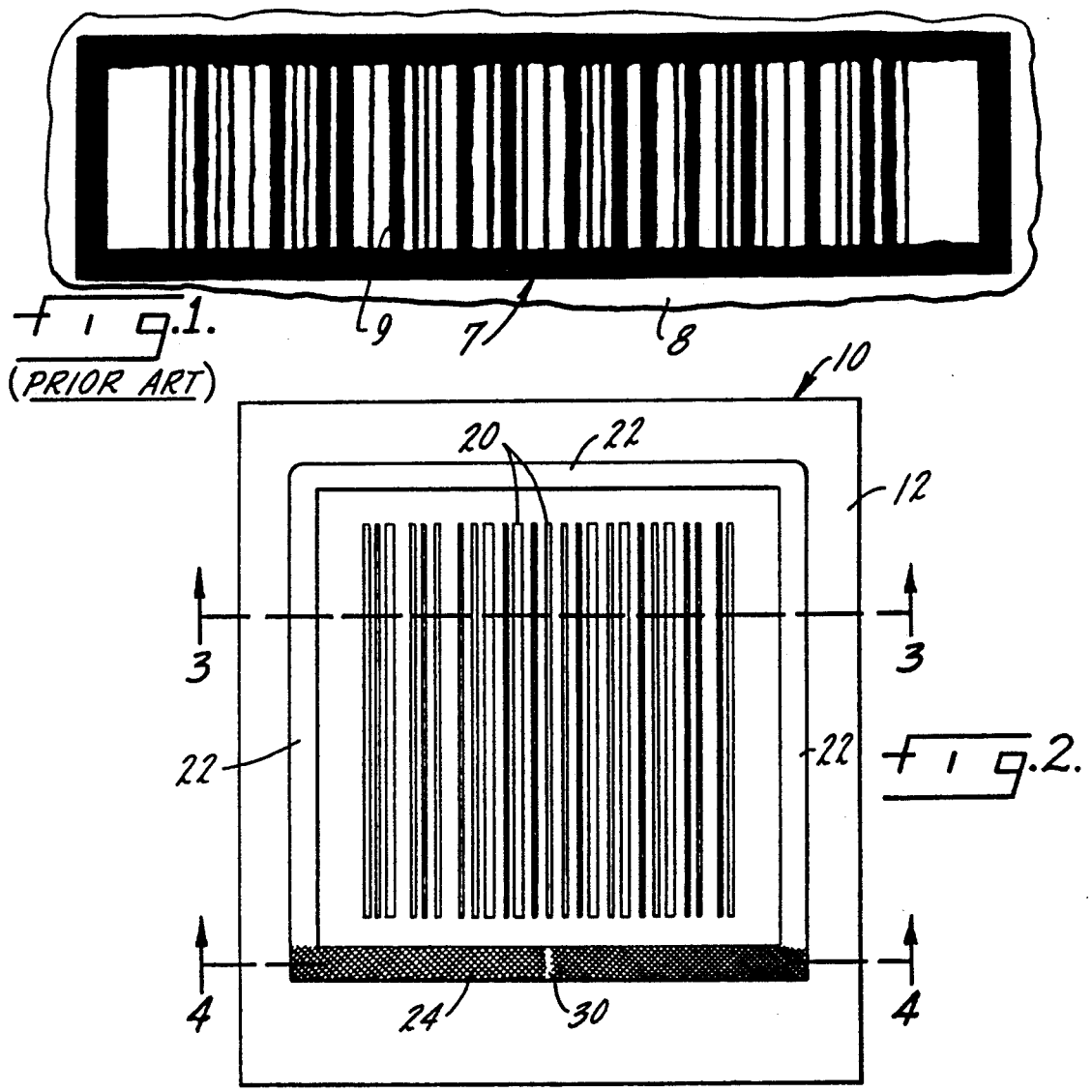
Fig. 1. (PRIOR ART)
Fig. 2.
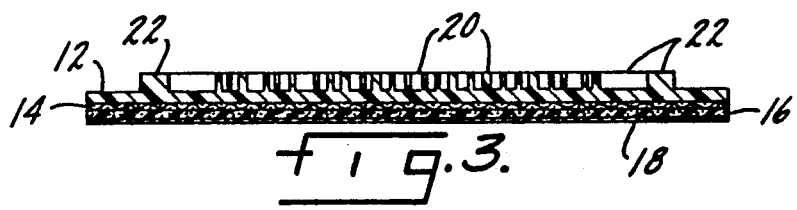
Fig. 3.
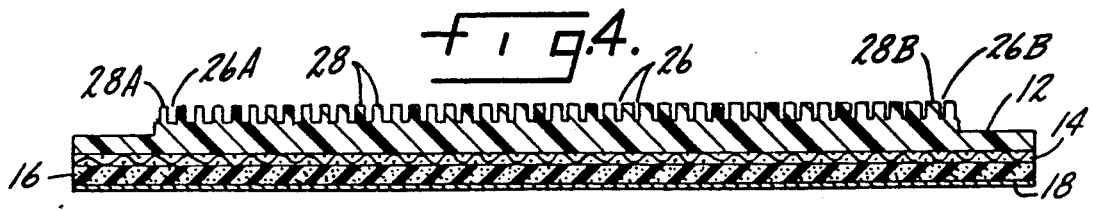
Fig. 4.

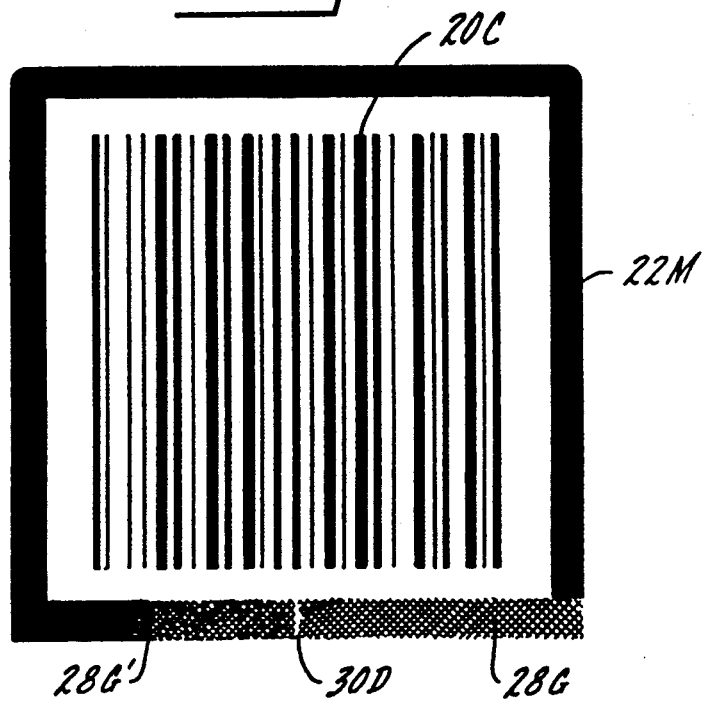
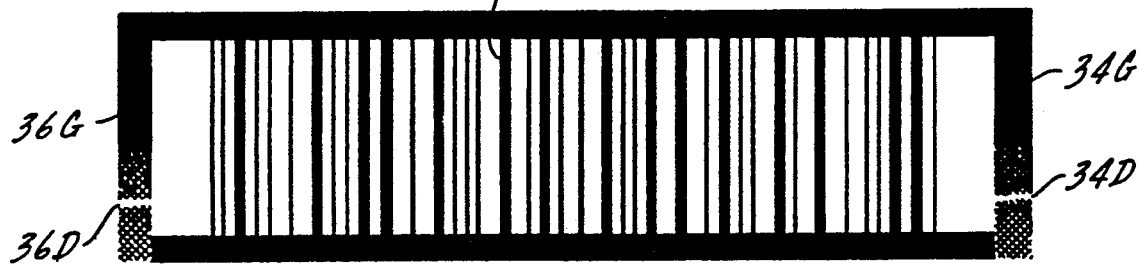

BAR CODE PRINTING PLATE AND METHOD

This invention relates to the printing of bar codes on consumer item packages, particularly corrugated boxes.

BACKGROUND OF THE INVENTION

Bar codes (price, inventory and so on) are printed on some consumer item packaging. At the check-out counter the code is scanned photoelectrically or by laser, or otherwise. The resultant image is transformed to appropriate register analog data including the sales price.

In some kinds of packages, particularly cardboard, the code when printed by ink is frequently blurred. The ink "bleeds," expanding the code bars, because too much ink may have been applied. The code is therefore indistinct and the transformed data are garbled, so to speak.

Thus, there is a demand that scanning of bar codes particularly on corrugated package material, be achieved with assurance of accuracy.

To print bar codes that are consistently scannable is by far the most difficult printing requirement that any corrugated manufacturer has to contend with; the failure rate is extremely high. Cross section samplings continue to show a failure rate of 25% to 40%. These failures are caused in part because of the inability to control the ink application when using rubber or photopolymer plates. Improper bar code specifications and variables for corrugated applications also enter the picture.

For a bar code to be scannable, the various vertical lines (bars) must be an exact dimension plus or minus a few thousandths depending on the nature and size of the code. This is difficult for the corrugated printer to achieve because of the following:

1. Irregularity of corrugated board.
2. Expansion of rubber or photopolymer printing plates.
3. No press controls for maintaining optimum inking of the printing plates.

SUMMARY OF THE INVENTION

The printing plate of the present invention enables achievement of accurate bar codes that scan consistently, providing technical support to the corrugated industry. The two factors that produce distortion or "print gain" in corrugated printing are minimized. Impression gain caused by too much printing pressure is reduced by as much as 80% with a built-in sponge pressure absorber, and ink spread is controlled by a monitor tint guide that provides ink control for the printer.

The features of the present printing plate allow the printer to produce bar code printing with substantial improvement, especially when applied to rubber or photopolymer printing plates. As noted above, "print gain" is reduced by employing a sponge shock absorber; excessive inking is avoided by means of a built-in relief tint guide that the press operator can employ as a gauge to adjust ink flow to the plates.

Specifically the problems are solved and the objectives of the invention are achieved by so constituting the bar code printing plate as to include a guide or gauge bar presenting a continuum of regularly spaced openings or cavities of progressively increasing diameter. This results in a series of projecting tiny tint relief stems receptive to ink. A tinting image is thereby printed by the stems concurrently with the bar code. The printer can visually inspect the tint image as an indicator of the amount of ink off-set to the container. Thus, the tinted imprint will be shaded from the greatest intensity at on edge (largest print dots) of the gauge to the least intensity (tiniest print dots) at the opposite edge. Clearly, if the whole guide or gauge is printed in solid black, too much ink has been used and the bar code is bound to be blurred. If the printed gauge is nearly clean, too little ink has been used. These are extreme examples.

In the preferred embodiment, a rib on the plate bearing the spaced tinting stems has a void or split somewhere along its length constituting a division or demarcation between the larger and smaller openings which define the tint stems. The printer will rely for his judgment on the heavier shaded portion of the tint image. By trial and error, by dry runs so to speak with the specific carton or container, the printer can determine the percent shade which represents an accurate well-formed bar code.

The part of the plate which prints the bar code is "relief," to use the term of art, and so are the small stems which print the tint gauge or guide, all the ink receptive surfaces lying in the same plane.

The invention is especially adapted to printing on corrugated boxes to avoid a blurred code image, but the invention is clearly applicable to other paperboard containers where too much ink easily bleeds or spreads because of the porous nature of paper.

BRIEF DESCRIPTION OF THE DRAWING

FIG. 1 is a fragmentary replica of an actual printed bar code on a cardboard carton, overly printed and blurred;

FIG. 2 is a plan view of a printing plate constructed in accordance with the present invention;

FIGS. 3 and 4 are sections of the plate respectively on the lines 3—3 and 4—4 of FIG. 2; and FIGS. 5 and 6 are replicas of two schemes of the present invention.

DETAILED DESCRIPTION

The subject matter of the invention is introduced by reference to FIG. 1, showing a replica of a bar code image 7 printed on a fragment 8 of a corrugated box.

The images are irregular at the longitudinal edges 9, evidencing the application of excessive ink which spreads or bleeds laterally. The code is too irregular accurately to be scanned.

In comparison, FIG. 5 is a replica of accurate bar code imaging achieved in the practice of the present invention, using the flexible printing plate 10 shown in FIG. 2; and FIG. 6 is of the same order as will be explained.

The printing plate 10 of FIG. 2 is a flexible plate to be attached to a rotary printing cylinder, inked by a conventional ink roller (not shown) fed with ink from a conventional ink fountain, not shown. Preferably the plate is a "photopolymer". This term is generic to the printing arts.

The term photopolymer identifies a resin system which is initially a viscous liquid and is sensitive to (hardened by)ultraviolet light. After exposure to ultraviolet light through a photo-negative of the image to be printed, the resin cures or hardens to a rubber-like consistency of about 20 to 50 Durometer. Photopolymers suitable for use in printing plate manufacture are described in U.S. Pat. No. 3,990,897. Suitable photopolymers are available from W. R. Grace and from Hercules Inc. of Wilmington, Delaware, under their trademark MERIGRAPH.

Structurally, the plate 10, FIG. 3, comprises the photopolymer 12 in the back of which is embedded a glass fiber mesh mat 14, and this combination is bonded to a sponge rubber backing 16 having a mask 18 detachably secured to its back. Upon peeling off the mask the plate is ready for attachment in a conventional way to a printing cylinder. A sponge backing is preferred, but not always necessary, as it helps avoid "print gain" in certain kinds of porous corrugated cardboard due to difficulty in regulating this printing pressure.

Exposure procedures and preparations of the photopolymer incidental to "etching" the relief characters and tint cavities of the plate 10 constitute no part of the present invention. Nonetheless, for a clear understanding of the background scene a photographic negative transparency is employed which will include the desired pattern for the raised relief projections which constitute the bar code ribs 20 of variant width but equal length, FIG. 2, and a surrounding rectangular border rib 22. It will be observed the bar code ribs are a series of in-line, picket-spaced ribs which print the bar code 20C, FIG. 5, along with an impression 22M of the border rib 22. The rectangular border rib or fence 22 helps to stabilize the code bars 20 when printing pressure is applied.

In the same manner (via transparency) a tinting guide or gauge bar 24 is formed. In fact, the guide or gauge bar 24 is one side of the border ribbing 22, the lower side as viewed in FIG. 2. The bar 24, FIG. 4, is etched (indented) with a series of cavities or gaps 26 of progressively narrowing diameter from one edge of the bar 24 to the other. Thus, at the extreme left, as viewed in FIG. 4, there are wide gaps or cavities as 26A and at the opposite end are the narrowest cavities as 26B; between 26A and 26B the gaps are progressively narrow, by small increments. The whole series is a cross-hatch pattern as can be seen in FIG. 2.

By the same token, the cross-hatched tone bar 24 presents relief tint printing stems 28; at one end these stems are of the narrowest order, 28A receiving the least ink and at the opposite end the relief tint printing stems are of the widest order receiving the most ink. Collectively, they print the tinting guide 28G, FIG. 5, as will be described, bearing in mind the image printed by the plate 10 will be the mirror image of that appearing in FIG. 2.

Preferably the tinting bar 24 has a discontinuity at 30, FIG. 2, whereby when the image is made, FIG. 5, there is a resultant discontinuity 30D in the tint gauge 28, midway. This is an aid to the printer who can use the narrow unprinted space 30D to judge the percent of ink density, that is, whether the ink "fill in" is confined to the left of 30D, FIG. 5, because if the ink "fill in" extends to the right of the demarcation 30D it is too dense and likely to produce a blurred code. It is to be stressed this is "species distinct," that is, the demarcation 30D may not be necessary at all, or it may be displaced one way or the other from a midway location depending on the species of paperboard being printed.

Referring now to FIG. 5, this is a replica of the image printed by the plate of FIG. 2, an "offset" image which is the reverse of the relief (printing) portions of plate 10. Thus, the reinforcing border 22, FIG. 2, prints out as 22M, the code bars 20 print out as 20C and the gauge bar 24 with its cross-hatching of progressively variant-width guide stems 28A–28B print out as the tinted cross-hatched gauge 28G. The printer, based on experience, determines if the tinting, FIG. 5, has crept too far to the right (too dense), not far enough (too light) or lies within an acceptable range.

Referring to FIG. 6 (another replicate print-out) the printing plate employed therefore may be such that there are identical tinting gauges 34G and 36G on opposite sides of the printed code bars 38; the guide demarcations 34D and 36D separate the tinting guides into long and short legs, again as an aid for the printer's judgment.

The invention may be embodied in a rubber printing plate as well.

In summary, the plate when inked is pressed against the paperboard material to be printed by the bar code. By relying on earlier test runs, using a test scanner, the printer will know the tolerance area of ink density spread on the gauge representing printed code bars having no error due to blurred images. If too dense, the supply of ink is reduced until the tint density is within the tolerance range.

The discontinuity line or demarcation as 30D is a considerable aid in this regard. For example, FIG. 5, 50% to 75% black in the tint gauge section 28G1 may represent the correct ink supply, but the supply is too dense if "all black" extends to the right of the demarcation 30D. In FIG. 6, 75% black and all black up to the demarcation 34D may be acceptable.

Then, in a sustained production run, it is a matter of glancing at randomly selected gauges to be sure the ink control continues to fit the tint tolerance limits.

Preferably the ink density gauge or guide bar as 24 is a continuation (one side) of the rectangular reinforcing border or fence 22 as this enables the printer quickly to reference the ink density pattern. Also, the arrangement is cost effective in preparing the printing plate because the guide thus serves two purposes without need for separate provision on the negative or transparency.

Hence, while a preferred embodiment of the present invention is disclosed and claimed, it is to be understood that the invention is capable of variation and modification.

I claim:

1. A flexible bar code printing plate receptive to inking for printing scannable bar code images on a consumer paperboard package, said plate being formed with an in-line picket-spaced series of raised relief bar code printing ribs of variant cross-section width in conformance with a code to be printed thereby, the top surfaces of the bars lying in a common printing plane, and said plate also being formed with an ink density gauge rib having its top surface in said plane adjacent the bar code ribs for concurrently printing a tint gauge adjacent the printed code image, said ink density gauge rib being formed with a series of openings progressively varying in diameter from one end thereof to the opposite end to produce relief tint stems of progressively variant width, whereby the code and a tint gauge are printed concurrently enabling the printed gauge to be inspected for an ink tint pattern deemed indicative of an unblurred bar code image.

2. A printing plate according to claim 1 which is made of photopolymer.

3. A printing plate according to claim 1 in which there is a void area in the series of tint stems dividing the wider stems from the more narrow stems.

4. A printing plate according to claim 1 in which a rectangular rib-like reinforcing fence borders the code printing ribs and of which the gauge rib is one side of said fence.

5. A printing plate according to claim 2 in which a rectangular rib-like reinforcing fence borders the code printing ribs and of which the gauge rib is one side of said fence.

6. A printing plate according to claim 3 in which a rectangular rib-like reinforcing fence borders the code printing ribs and of which the gauge rib is one side of said fence.

7. A printing plate according to claim 2 in which there is a void area in the series of tint stems visibly dividing the wider stems from the more narrow stems.

8. A printing plate according to claim 4 in which there is a void area in the series of tint stems visibly dividing the wider stems from the more narrow stems.

9. A printing plate according to claim 1 in which the plate is backed with sponge rubber.

10. A printing plate according to claim 6 in which the plate is backed with sponge rubber.

11. A quality control method of avoiding printing of a blurred bar code on a paperboard container comprising the steps of:
   providing a flexible bar code printing plate being formed with an in-line picket-spaced series of raised relief bar code printing ribs of variant cross-section width in conformance with a code to be printed thereby, said plate also being formed with an ink density gauge rib having its top surface in said plane adjacent the bar code ribs for concurrently printing a tint gauge adjacent the printed code image, said ink density gauge rib being formed with a series of openings progressively varying in diameter from one end thereof to the opposite end to produce a series of relief tint stems of progressively variable width,
   printing on the container with said flexible bar code printing plate, reducing the quality of ink applied to the plate if the printed tint gauge exhibits a pattern of excessive ink density.

12. A quality control method of avoiding printing of a blurred bar code on a paperboard container comprising the steps of:
   providing a flexible bar code printing plate being formed with an in-line picket-spaced series of raised relief bar code printing ribs of variant cross-section width in conformance with a code to be printed thereby, said plate also being formed with an ink density gauge rib having its top surface in said plane adjacent the bar code ribs for concurrently printing a tint gauge adjacent the printed code image, said ink density gauge rib being formed with a series of openings progressively varying in diameter from one end thereof to the opposite end to produce a series of relief tint stems of progressively variable width, said series of tint stems having a void area dividing the wider stems from the more narrow stems, said printing plate having a rectangular rib-like reinforcing fence bordering the code printing ribs, said gauge rib being one side of said fence,
   printing on the container with said flexible bar code printing plate, reducing the quantity of ink applied to the plate if the printed tint gauge exhibits a patter of excessive ink density.

* * * * *